United States Patent
Arai

[11] Patent Number: 6,154,846
[45] Date of Patent: Nov. 28, 2000

[54] SYSTEM FOR CONTROLLING A POWER SAVING MODE IN A COMPUTER SYSTEM

[75] Inventor: Makoto Arai, Tokyo, Japan

[73] Assignee: Kabushiki Kaisha Toshiba, Kawasaki, Japan

[21] Appl. No.: 08/943,124

[22] Filed: Oct. 3, 1997

[30] Foreign Application Priority Data

Jan. 6, 1997 [JP] Japan ................................. 9-000221

[51] Int. Cl.[7] ...................................................... G06F 1/32
[52] U.S. Cl. ........................................................ 713/323
[58] Field of Search ........................ 395/750.03, 750.05, 395/750.06, 182.22; 713/320, 323, 324; 714/24, 15

[56] References Cited

U.S. PATENT DOCUMENTS

| | | |
|---|---|---|
| 5,379,435 | 1/1995 | Hanaoka . |
| 5,435,005 | 7/1995 | Saito . |
| 5,551,043 | 8/1996 | Crump et al. ...................... 395/750.05 |
| 5,659,762 | 8/1997 | Sawada et al. ..................... 395/750.05 |
| 5,664,203 | 9/1997 | Hong et al. ........................ 395/750.05 |
| 5,784,628 | 7/1998 | Reneris .............................. 395/750.01 |
| 5,978,922 | 11/1999 | Arai et al. ............................... 713/323 |

*Primary Examiner*—Glenn A. Auve
*Attorney, Agent, or Firm*—Finnegan, Henderson, Farabow, Garrett & Dunner, L.L.P.

[57] ABSTRACT

A power saving process in a computer system that can be suspended, allowing for immediate restoration of an operating state just before the power saving process without waiting for completion of the process. During the power saving process, the contents of the main memory are saved to a hard disk drive in memory block units. Every time the saving of a memory block is completed, the key buffer of a keyboard controller is checked to confirm the existence of any key input. When a key input is detected, the power saving process is suspended, and the system is restored to the previous operating state.

10 Claims, 6 Drawing Sheets

SYSTEM FOR CONTROLLING A POWER SAVING MODE IN A COMPUTER SYSTEM

BACKGROUND OF THE INVENTION

1. Field of the Invention

The present invention relates to a computer system having a power saving function and an apparatus and method for controlling the power saving function. In particular, the present invention relates to an apparatus and method for suspending the power saving process so as to restart a previously running computer operation without waiting for completion of the power saving function.

2. Description of the Related Art

In recent years, a variety of portable computers, have been developed. These units typically run on a battery and therefore, it is desirable to save power and lengthen the amount of time the computer will run on a single battery charge.

Various types of power-saving modes are used for battery consumption. One is called a suspending mode. When the computer system enters into the suspending mode most of the devices in the system are powered down. The main memory is not powered down because it stores the system data and the user program and is needed to re-start an operation that was suspended. The system data saved in the main memory includes a CPU status and various peripheral unit statuses that existed just before entering the suspending mode. The main memory also stores an operating system and execution status of application programs and any user data produced by the application programs.

The saving of the system data is executed by a suspending routine included in a system Basic Input/Output program (BIOS). The system BIOS controls hardware in the computer system in response to requests from the operating system. The BIOS contains a plurality of device drivers for controlling the respective hardware devices in the computer system. The suspending routine in the BIOS is activated when a power source of the computer system is switched to OFF.

If the battery loses all power during the suspending mode, all data in the main memory is lost and the system can not return to its prior operating state. To prevent this loss, another system is used to supplement the suspending mode. Every device in the computer is not powered down until after saving contents of a main memory into a secondary memory.

As operating systems and application programs improve, the capacity of a main memory in a computer system is steadily increasing. This increase in capacity increases the time required to save the contents of the main memory to a hard disk and the time to perform a power saving process.

In a conventional computer system a power saving process begins in response to, for example, a power source being switched OFF by a user or a lid of the computer being closed. Once the process starts, the system can not be restored to its prior state of operation until the power saving process has completed.

Given the relatively long period of time required for a power saving process, a computer can not be quickly restarted. If a user turned the system power source to OFF by mistake, or if a request for continuing a previous operation is generated during the power saving process, the computer system must wait to restart until the lengthy power saver process is completed. Therefore it is desirable to suspend the power saver operation and enable regular computer processes to continue.

SUMMARY OF THE INVENTION

Systems and methods consistent with the present invention includes a power saver function that saves contents of a main memory to a hard disk drive when a system power source is switched to OFF. During the power saving process, the contents of the main memory are saved to a secondary memory drive in memory block units. Every time the saving of a memory block is completed, the key buffer of a keyboard controller is checked for any input. When an input is detected, the power saving process is suspended and the system is restored to the previous operating state.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention.

In the drawings.

DETAILED DESCRIPTION OF THE PRESENT INVENTION

Figure 1:
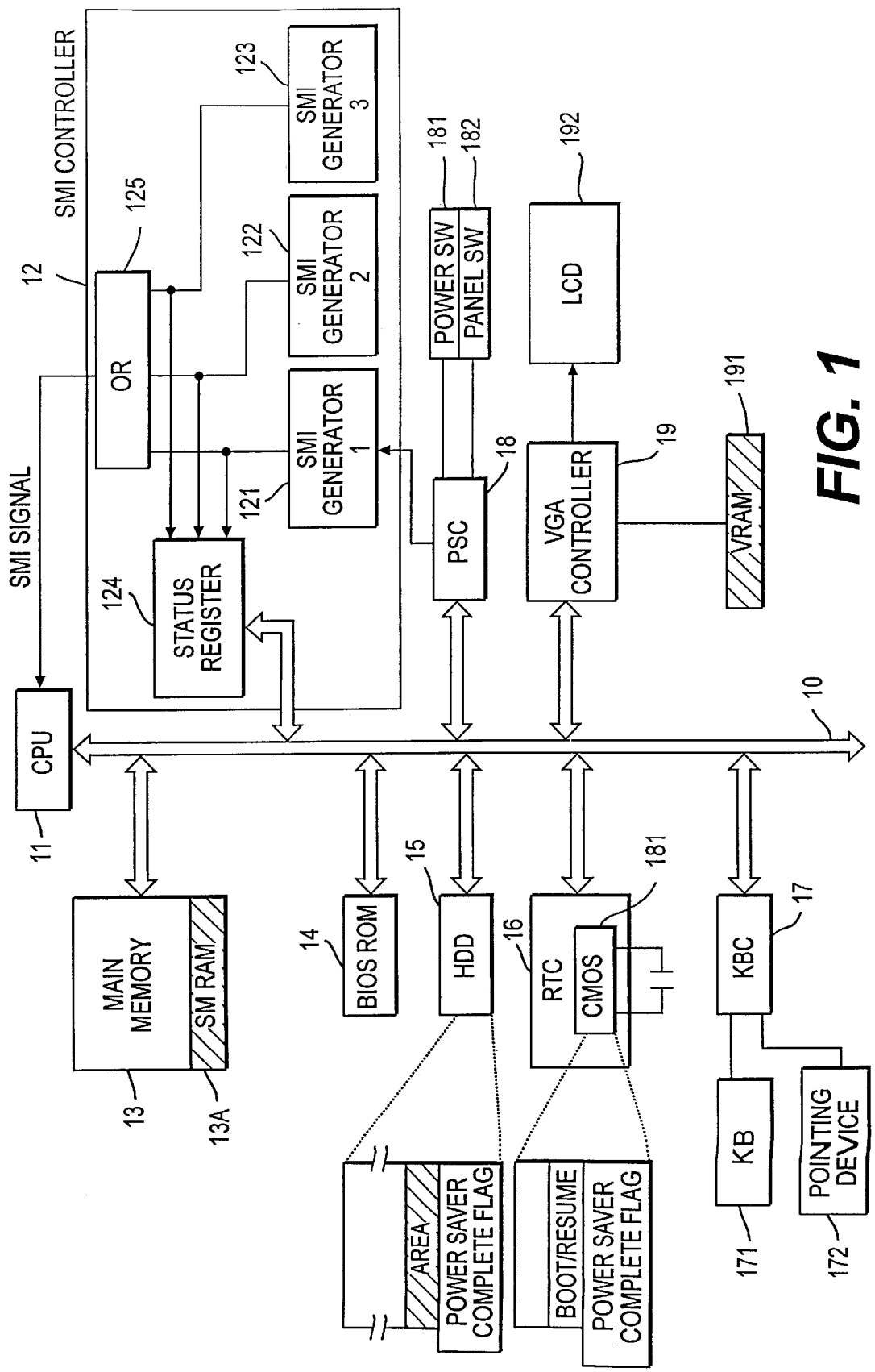
FIG. 1 is a block diagram of a computer system according to the present invention.

Reference will now be made to the drawings where like reference numerals designate identical or corresponding parts throughout the several views.

FIG. 1 shows a block diagram of a computer system according to the present invention. The illustrated computer system is a notebook type or portable personal computer system. It is constructed of a main body and a Liquid Crystal Display (LCD) panel unit fitted to the main body so that it can freely open and close. Mounted on the system board of the main body are a system bus 10, a Central Processing Unit (CPU) 11, a System Management Interrupt (SMI) control circuit 12, a main memory 13, a BIOS-ROM (Read Only Memory) 14, a magnetic hard disk device (HDD) 15, a Real Time Clock (RTC) 16, a Key Board Controller (KBC) 17, a Power Source Controller (PSC) 18 and a Video Graphics Array (VGA) controller 19.

The CPU 11 may be, for example a Pentium microprocessor manufactured and distributed by Intel Corporation. The CPU 11 has built in basic system management functions. The CPU 11, has several operating modes such as a real mode, a protect mode and a virtual mode for executing programs such as application programs and operating systems (OS). The CPU 11 also has an operating mode for achieving a system management function which is called a system management mode (SMM).

The real mode is a mode during which the CPU 11 can access a maximum of 1 M-byte of memory space. The conversion of a logical address to a physical address is performed by an address computation format which determines the physical address by the offset value from a base address indicated by a segment register.

The protect mode is a mode which allows access to a maximum of 4 G-byte of memory space per task. The logical address is determined using an address mapping table called a descriptor table. This logical address is finally converted to a physical address by paging.

The system management mode (SMM) is a pseudo-real mode. The address computation format in this mode is identical to the address computation format in the real mode. No reference is made to the descriptor table, nor is paging executed. However, the SMM can access memory space which exceeds 1 M-byte, in the same way as the protect mode.

When the system management interrupt (SMI) is issued to the CPU 11, the current operating mode of the CPU 11 is switched to SMM. When it is switched to the SMM by the SMI, the CPU 11 saves the CPU status, which is the content in the CPU register at that time, to a System Management Random Access Memory (SMRAM) 13A. When a return instruction (RSM instruction) is executed in the SMM, the CPU 11 restores the CPU status to the CPU register from the SMRAM 13A, and returns to the operating mode in existence prior to the SMI generation. In this embodiment, a system management program such as a power saving routine is executed in the SMM. The power saving routine is for turning the system power OFF after the content of main memory 13 and a VRAM (Video Random Access Memory) 191 have been saved to a hibernation area in the storage area of a HDD 15. The power saving routine is executed in response to a SMI (System Management Interrupt) caused by switching the system power source switch 181 OFF or by closing the LCD panel unit.

SMI is a type of non maskable interrupt (NMI). It has the highest priority for interruption, with a priority higher than a non-maskable interrupt (NMI) or a maskable interrupt (INTR). By issuing an SMI, the power saving function can start independently of the environment of any application program or operating system which is being executed.

The SMI control circuit 12 provides hardware for controlling SMI functions. As shown in FIG. 1, the control circuit 12 includes SMI generator circuit 121 for starting the power saving process, SMI generator circuits 122 and 123, SMI status register 124 and an OR circuit 125.

When the LCD panel unit is closed, power source controller 18 presses the power source switch 181 or an opening/closing detection switch 182 detects the closure, SMI generator circuit 121 then generates the SMI signal for activating the power saving process. The other SMI generator circuits 122 and 123, are responsive to other events such as software SMI, global standby SMI, local standby SMI and external input SMI.

When any of the SMI generator circuits 121, 122 and 123 generates an SMI signal, the OR circuit 125 supplies the SMI signal to the CPU 11. The respective SMI generator circuits 121, 122 and 123 continue to maintain the SMI signal in the active state until the CPU 11 exits the SMM (System Management Mode). Consequently, when another SMI signal is generated during the SMI processing for one SMI signal, after the CPU 11 has exited the SMM corresponding to the first SMI signal, it once more shifts to SMM.

The SMI status register 124 maintains status data showing the cause of SMI generation and status of the respective SMI generator circuits 121, 122 and 123.

Figure 2:
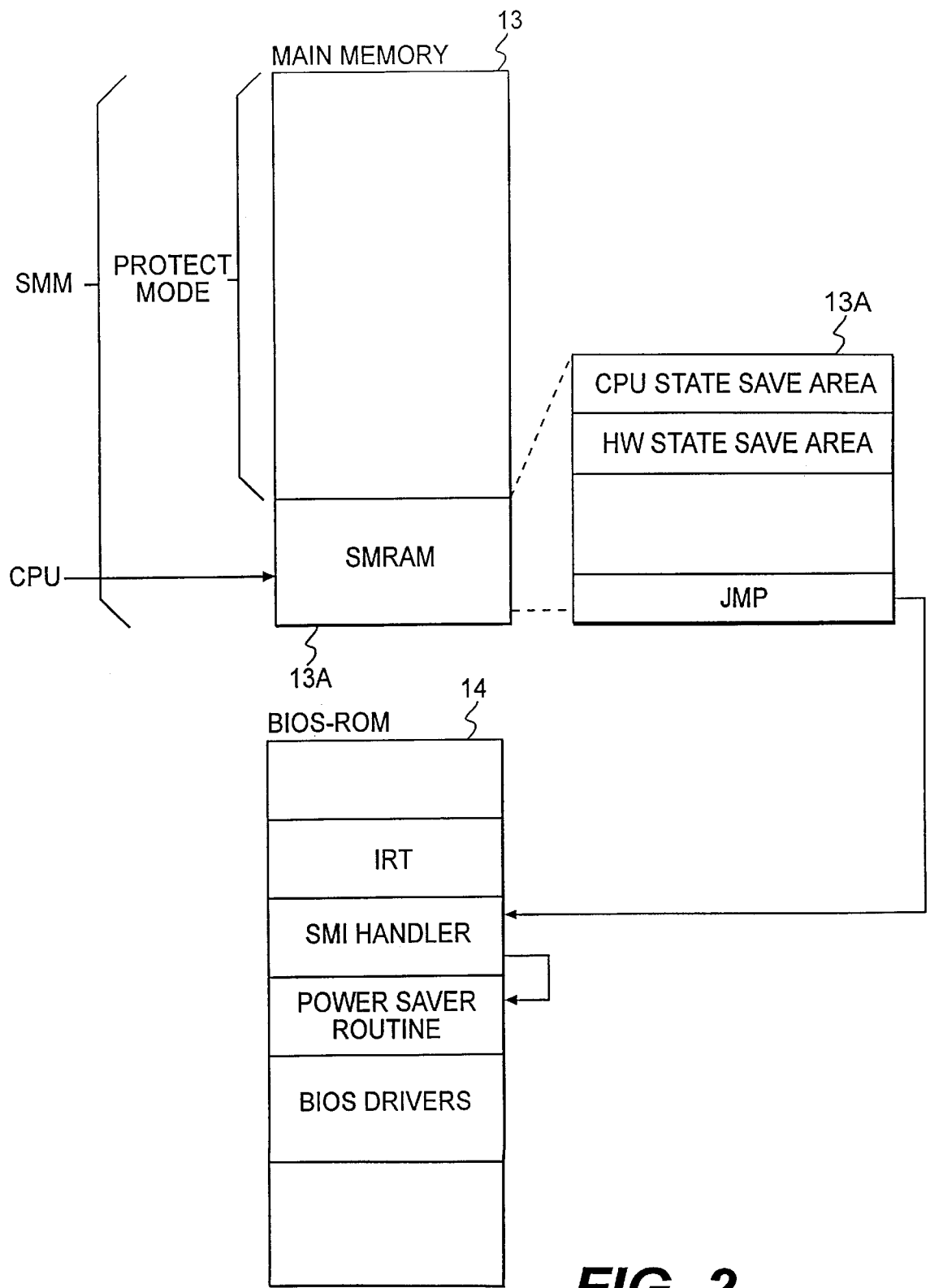
FIG. 2 is a block diagram of a main memory and BIOS-ROM system according to the present invention.

The memory 13 is a main memory such as a DRAM (Dynamic RAM). As seen in FIG. 2, the SMRAM (System Management RAM) 13A is a memory space that is allotted as a part in the physical memory of the main memory 13. Access to the SMRAM is only available by mapping memory addresses when an SMI signal has been input to the CPU 11. Here, the address region where the SMRAM is mapped is not fixed. It is possible to alter it to any place with 4 G-byte space by a register called SMBASE. The SMBASE register cannot be accessed other than during the SMM (System Management Mode).

When the CPU 11 shifts to the SMM, the CPU status is saved to the SMRAM 13A in stack form. The instruction for calling up the system management program for the BIOS-ROM 14 is stored in the SMRAM 13A. This instruction is an instruction which is first executed when CPU 11 enters the SMM. Control shifts to the system management program by execution of this instruction.

The BIOS-ROM 14 stores the system Basic I/O System. It is comprised of a flash memory so that program rewriting is possible. The system BIOS systematizes the function execution routines which access the various hardware in the system, and it is also comprised so that it operates in the real mode.

The system BIOS includes an IRT (Initialization and Reliability Test) routine which is executed when the system power is switched ON for supervising I/O status, and a BIOS driver group for controlling various hardware at startup.

System control programs such as a SMI handler and the power saver routine are also stored in the BIOS-ROM 14.

HDD 15 is used as the secondary memory of this system. As shown in the drawing, a power saver area and a "Power Saver Complete" flag setting area are guaranteed in part of its storage area. The power saver area and the "Power Saver Complete" flag setting area are guaranteed by the initialization of HDD 15 by IRT and by the system BIOS.

The RTC 16 is a clock module and has a CMOS memory 161 which is backed up by a separate battery. System configuration information, which contains information for selecting boot mode or resume mode as the power-up mode, and the "Power Saver Complete" flag are set in the CMOS memory 161. The boot mode is the mode which activates the bootstrap process for starting up the operating system when the system power is switched ON. The resume mode is the mode which executes the power saver process when the power source is switched OFF, and it is the mode which restores the contents saved on the HDD to the original memory and to the CPU when the system power is switched ON.

Keyboard controller 17 is for controlling keyboard 171 and pointing device 172, such as a pointing stick or a mouse.

The VGA controller controls the LCD 192. The LCD 192 displays screen data drawn in the VRAM 191 on the LCD 192 in the LCD panel unit.

Based on the above explained functioning of the computer system, the power saving process of the present invention is explained below.

When the power source switch 181 in FIG. 1 has been switched OFF by the user, or when the closure of the LCD panel unit is detected by panel ON/OFF switch 182, the power source controller (SSC) 18 informs the SMI generator circuit 121 of a power source OFF. In response, the SMI generator circuit 121 generates an SMI signal and outputs the signal to the CPU 11.

When the SMI signal is input to the CPU 11, the CPU 11 is switched from its current operating mode to the SMM. When it enters the SMM, the CPU 11 first maps the specified memory address in the SMRAM 13A.

A CPU state storage area stores the status of the CPU and hardware status storage areas store the statuses of other hardware in stack form in the SMRAM 13A. Also, a jump code which designates the interrupt destination of the SMI handler of the BIOS-ROM 14 is set.

The CPU 11 fetches the SMM start address code, in other words the jump code set in the SMRAM 13A, and executes the SMI handler in the BIOS-ROM 14 designated by that jump code. The process to this point is executed by a microprogram in the CPU 11.

The SMI handler called up by the execution of the jump code determines the cause of the SMI by referring to the status information which has been set in an SMI status register 124. If it is an SMI caused by power source OFF, the SMI handler requests the execution of the power saver routine in the BIOS-ROM 14.

Figure 3:
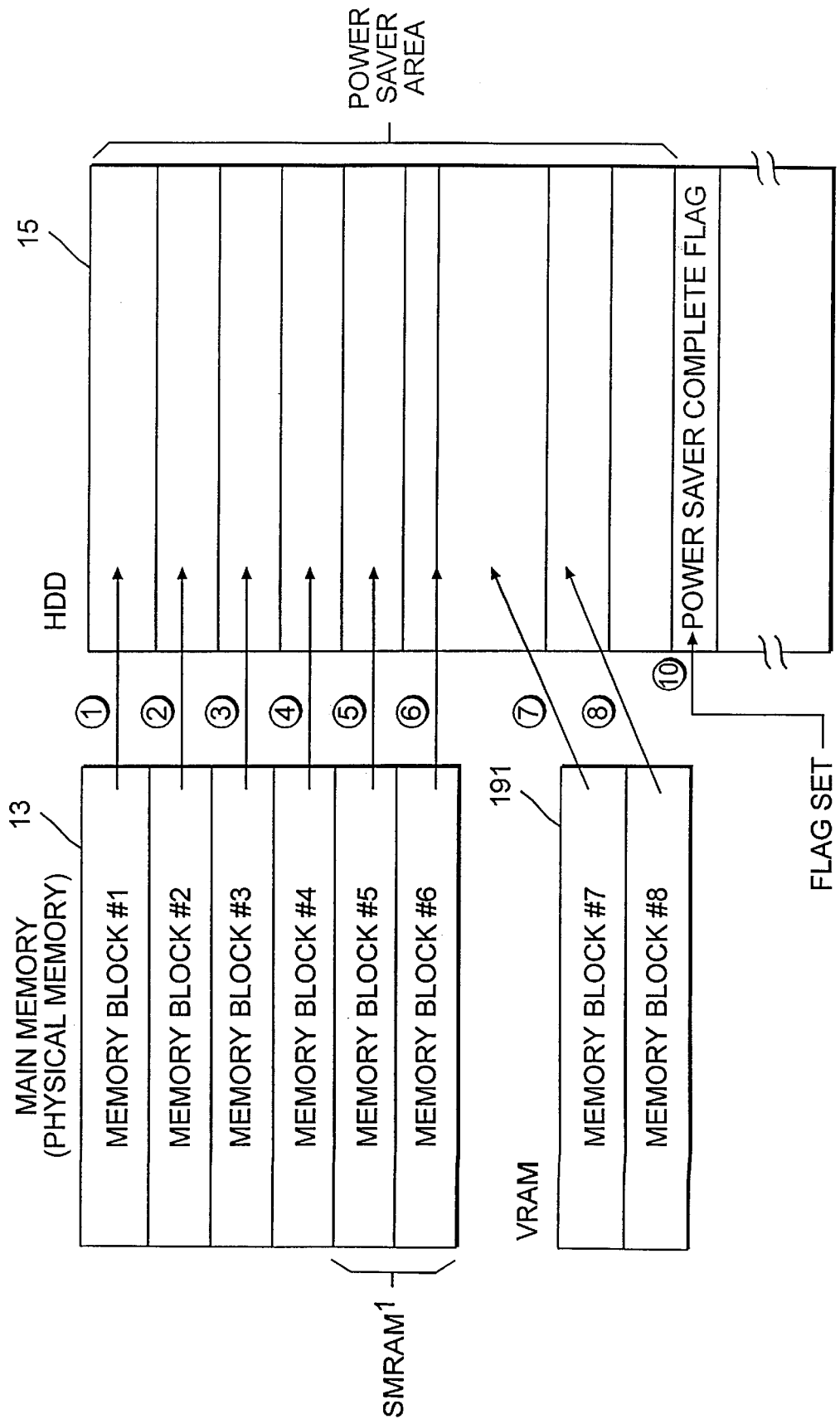
FIG. 3 is a block diagram showing the relationship between the main memory and a secondary memory according to the present invention.

FIG. 3, shows the theory of the power saver process. In the power saver process, the content of main memory 13, which includes the SMRAM 13A, and the content of the VRAM 191 are saved to the power saver area of the HDD 15. The whole memory space, which is the subject of saving, is divided into multiple memory blocks, and data transmission to the HDD 15 is executed in block units.

For simplifying the explanation, FIG. 3 shows the case of dividing the main memory space into 8 memory blocks from memory block #1 to memory block #8. In practice, the whole memory space is block-divided in data size units equivalent to 1 track of the HDD 15.

The process of transmitting data to the HDD 15 is sequentially executed from memory block #1 to memory block #8. On completion of the transmission of a memory block and before starting the process of transmitting the data of the next memory block to the HDD 15, a hardware status is checked. This hardware status check detects whether or not the user has generated a specified input during the power saving processing period.

When a specified input is detected, the power saving process is suspended at that point in time, the CPU 11 and other hardware are all restored to their states prior to the SMI, and control is returned to the program which was originally interrupted. Specified input events may include a key input from the keyboard 171, the operation of pointing-device 172 and the opening of the LCD panel unit. These can be detected by reading the key buffer of keyboard controller 17 or reading the status register of power source controller 18. If no specified input occurs, a Power Saving Complete is set in the HDD 15.

The above described power saving process is suspended when an input is detected and the system is restored to the operating state in existence prior to SMI generation. Thus, even after the power saving process has started, the user, by performing a key input for example, is able to suspend the power saving process and immediately continue the previous CPU operation.

Figure 4:
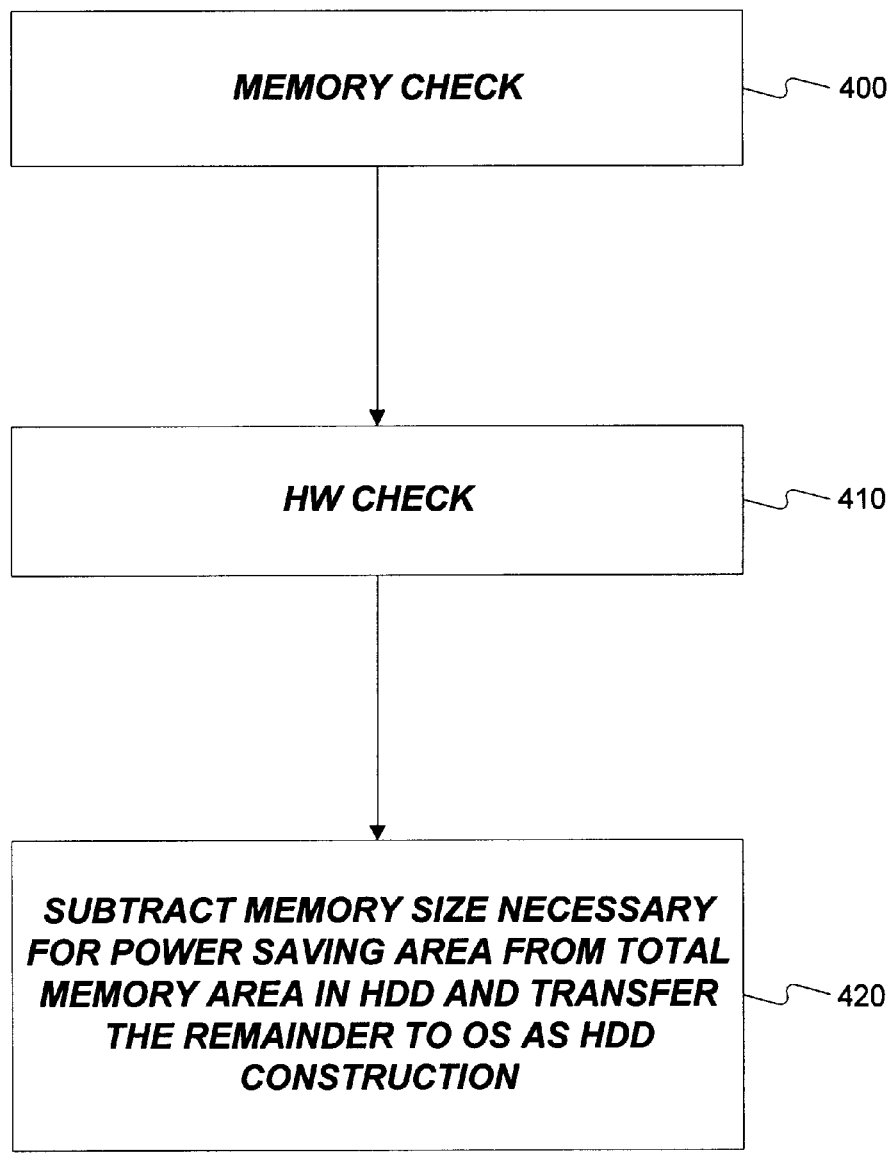
FIG. 4 is a flow chart of steps for acquiring a power saving area in a memory system according to the present invention.

FIG. 4 explains the power saver area acquisition process which is executed by the IRT routine when the system power is switched ON.

At system startup, the IRT routine executes tests of the memory in the system (step 400) and of the hardware (step 410). In these test and initialization processes, the physical size of main memory 13, the physical size of VRAM 191 and the construction of HDD 15 (number of heads, number of sectors) are examined. Then, a power saving area equivalent to the total memory size of the main memory 13 and the VRAM 191 is acquired in the HDD 15 (step 420). The memory size necessary for the power saving area is sub-tracted from the total memory in HDD and the remainder is used by the operating system (OS). The power saving area is used exclusively by the power saving routine and is not used by the OS to prevent damage to the system data and the user data.

Figure 5:
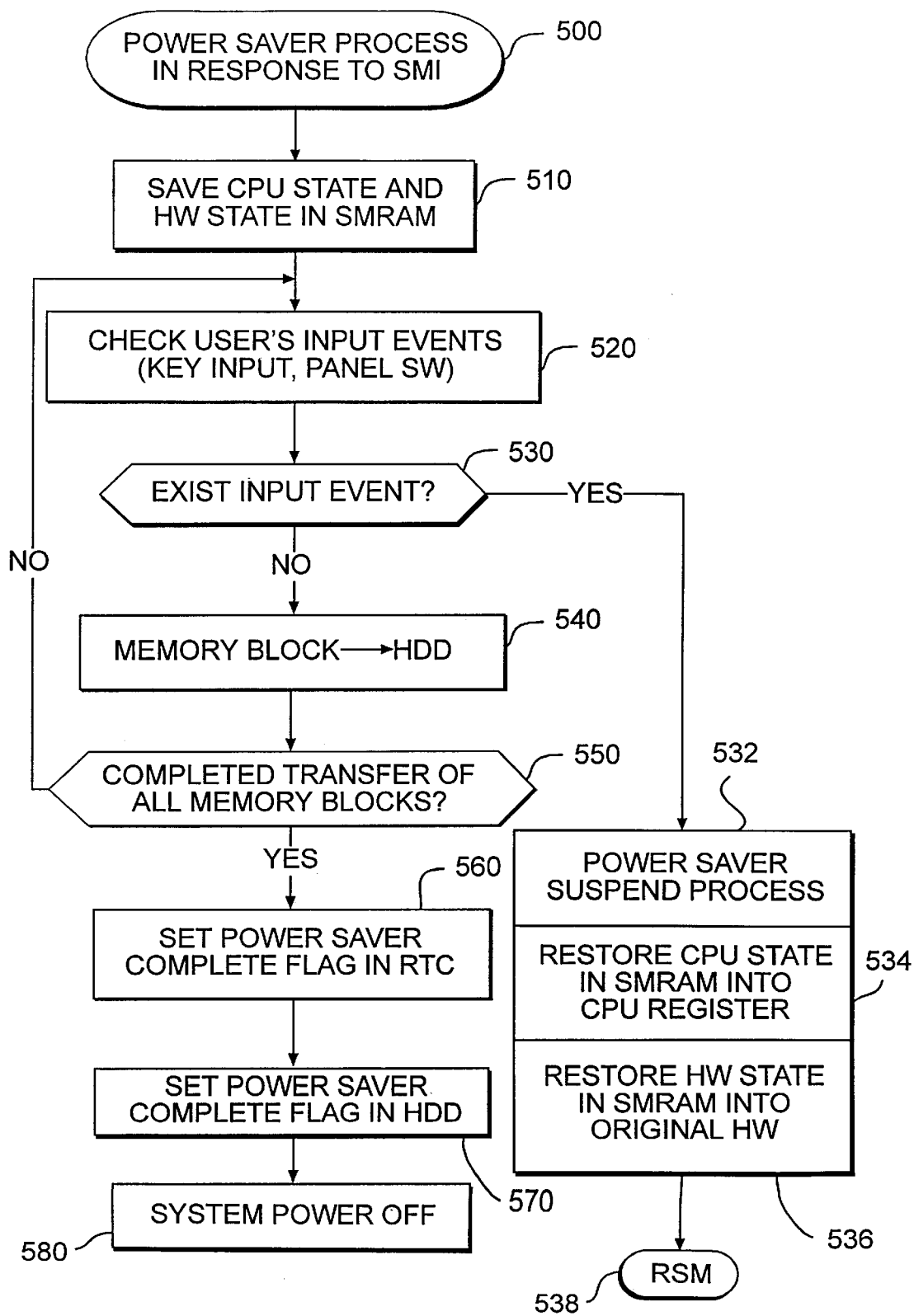
FIG. 5 is a flow chart of steps for carrying out the power saving process according to the present invention.

FIG. 5 shows a flow chart for carrying out the power saving process sequence which is activated in response to the generation of an SMI caused by switching the power source OFF (step 500).

The power saving routine saves the CPU state and the hardware state to the SMRAM 13A (step 510). In this embodiment, the power saving routine is executed in the SMM. Therefore, the CPU state prior to SMI generation has already been saved to the SMRAM 13A when switching to the SMM. Consequently, step 510, only saves the hardware state.

Next, the power saving routine reads the register of each relevant item of hardware in order to check for the existence of the generation of an input event to cause suspension of the power saving process (step 520). Then the routine determines whether or not any input event has been generated (step 530).

If the generation of an input event is detected in step 530, the power saver routine starts the power saver suspension process (step 532), and restores the CPU state (step 534) and the hardware state (step 536) in the SMRAM 13A to the CPU 11 register and the relevant hardware registers respectively. Then, return instruction RSM is executed and control is returned to the program which was interrupted by the SMI (step 538). The operating environment in existence prior to the SMI generation is now restored.

When no input event has been generated, the power saver routine transmits the content of the main memory 13, which contains the SMRAM 13A, and the content of the VRAM 191 to the power saver area of the HDD 15 in memory block units (step 540). On completion of the transfer of one memory block, the routine checks whether or not the transmission of all memory blocks has been completed (step 550). If not, steps 520–550 are repeated until completion or until an input event occurs.

When all memory blocks have been transferred without the generation of an input event, the power saver routine sets the power saver complete flag in a CMOS 161 of the RTC 16 and the HDD 15 (steps 560 and 570). The routine then turns off the system power by transmitting a "power OFF" command to power source controller 18 (step 580).

Figure 6:
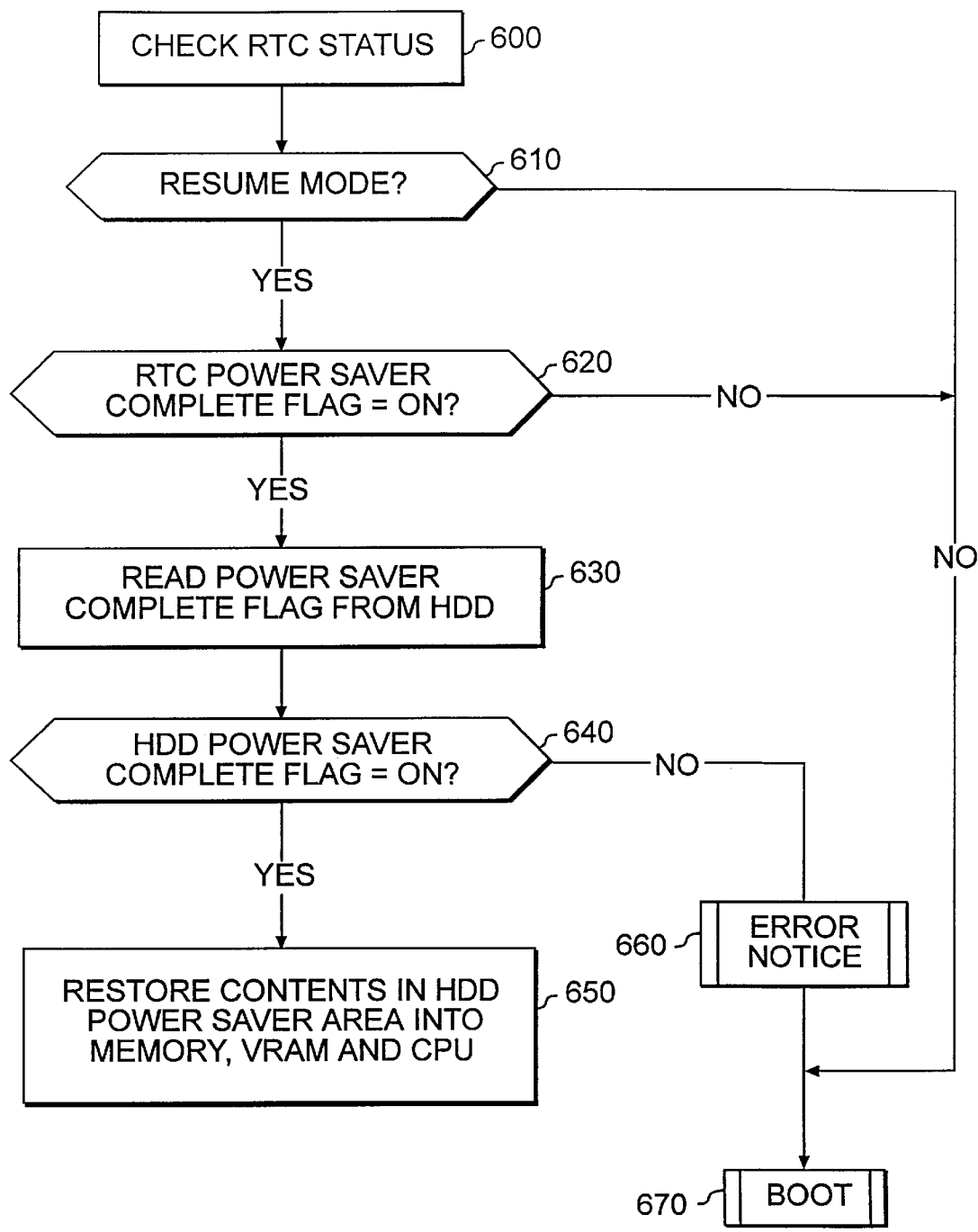
FIG. 6 is a flow chart of steps for resuming computer operations and for restoring saved contents according to the present invention.

FIG. 6 shows a resume process which restores the contents saved by the power saver process.

When the system power is switched ON, the system BIOS reads the setting information in the CMOS 161 of the RTC 16 (step 600). The system BIOS determines whether the system is in resume mode or boot mode (step 610). If in the resume mode, the system checks whether or not the power saver complete flag has been set in the CMOS 161 (step 620). If the flag is not set or if the system is in the boot mode, the bootstrap process which activates OS is executed after the IRT routine in FIG. 3 has been executed (step 670).

If the power saver complete flag is set in the CMOS 161, the power saver complete flag area in the HDD 15 is read (step 630). The system determines whether the read HDD power saver complete flag is set (step 640). If the power saver complete flag is not set in the HDD 15, the content of the power saving area of the HDD 15 is invalid. This means, for instance, that the HDD 15 has been exchanged for another HDD while the power source was OFF. An error message is then displayed on the screen by the system BIOS (step 660) and the bootstrap process is activated by the user responding with a specified key input operation to that message (step 670).

If the power saver complete flag is set in the HDD 15, the system BIOS restores the operating state in existence prior to the SMI generation in which the power saving process was activated by restoring the content of the power saving area in the HDD 15 respectively to the CPU 11, the various hardware, main memory 13 and VRAM 191, and control is returned to the program which was interrupted by the SMI (step 650).

In this embodiment, a key input from keyboard 171, operation of pointing device 172 and the opening operation of the LCD panel unit have been described as causes for suspension of the power saving process. However, for example, the re-pressing of power source switch 181 can also be made a cause for power saving suspension. Also, in the case of key input, any combination of keys may be assigned as input events which cause power saver suspension.

As explained above, according to the present invention, the power saver process can be suspended if required even after the process has started. Therefore, even after the process has started due to a power source OFF operation by the user, the user can immediately restart operations by executing a key input, without waiting for completion of the process.

The foregoing description of preferred embodiments of the invention has been presented for purposes of illustration and description. It is not intended to be exhaustive or to limit the invention to the precise form disclosed, and modifications and variations are possible in light of the above teachings or may be acquired from the practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A computer system having a power saving function, comprising:

means for saving, during a saving period, contents of a main memory of the system to a secondary memory device in response to a predetermined event;

means for detecting an input event during the saving period, and means, responsive to the detection of the input event, for interrupting the means for saving and restoring an operating state of the computer system in existence before the predetermined event.

2. The computer system according to claim 1, wherein the means for saving further includes means for transmitting the contents of the main memory to the secondary memory device in a plurality of block units of the main memory, and wherein the means for detecting includes means for checking for an existence of an input event every time the saving means has completed a transmission of a block of the main memory.

3. The computer system according to claim 1, wherein the detecting means includes means for detecting a key input operation as an input event.

4. The computer system according to claim 1, wherein the detecting means includes means for detecting a pointing operation as an input event.

5. The computer system according to claim 1, wherein the detecting means includes means for detecting an opening/closing operation of a display panel as an input event.

6. The computer system according to claim 1, wherein the saving means includes means for saving main memory contents in response to a system power switch being turned off.

7. A computer system having a power saving function that can save contents of a main memory of the system to a secondary memory device in response to a predetermined event during a saving period comprising:

means for saving a status of a central processing unit (CPU) in the system to the main memory;

means for saving, during the saving period, the contents of the main memory to a secondary memory device by dividing the main memory into a plurality of blocks and transmitting the content of each block to the secondary memory device in block units;

means for detecting an input event during the saving period; and means for interrupting the means for saving and for restoring an operating state when a specified input event is detected by the detecting means.

8. The computer system according to claim 7, wherein this interrupting means includes means for restoring the CPU status that has been saved in the main memory to a register of the CPU.

9. A method for controlling a power saving process in a computer system, comprising the steps of:

detecting an existence of an input event during a saving period in which contents of a main memory is saved to a secondary memory device;

interrupting a saving process of the content of the main memory to the secondary memory; and restoring an operating state in existence prior to the saving period when a specified input event is detected by the detecting step.

10. A method for controlling a power saving process and saving contents of a main memory of the system to a secondary memory device, comprising the steps of:

saving a central processing unit (CPU) status of the system to the main memory;

dividing the main memory into a plurality of blocks;

transmitting contents of the main memory to the secondary memory device in block units;

checking for an existence of an input event after the completion of the transmission of a divided block of the main memory to the secondary memory device;

interrupting the transmitting step when the input event occurs; and restoring the saved CPU status when the input event occurs.

* * * * *